US009157734B2

(12) United States Patent
Choiniere et al.

(10) Patent No.: US 9,157,734 B2
(45) Date of Patent: Oct. 13, 2015

(54) OPTICAL AUTOMATIC ATTITUDE MEASUREMENT FOR LIGHTWEIGHT PORTABLE OPTICAL SYSTEMS

(71) Applicant: BAE SYSTEMS INFORMATION AND ELECTRONIC SYSTEMS INTEGRATION INC., Nashua, NH (US)

(72) Inventors: Michael J. Choiniere, Merrimack, NH (US); Robert W. Costantino, Milford, NH (US); Mark P. Devins, Nashua, NH (US); Derek P. Janiak, Manchester, NH (US); David A. Richards, Medford, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 268 days.

(21) Appl. No.: 13/904,046

(22) Filed: May 29, 2013

(65) Prior Publication Data

US 2013/0335558 A1    Dec. 19, 2013

Related U.S. Application Data

(60) Provisional application No. 61/660,117, filed on Jun. 15, 2012.

(51) Int. Cl.
*H04N 7/18*   (2006.01)
*G01B 11/26*  (2006.01)
*G01C 9/00*   (2006.01)

(52) U.S. Cl.
CPC . *G01B 11/26* (2013.01); *G01C 9/00* (2013.01)

(58) Field of Classification Search
CPC .................................................. G01B 11/26
USPC .......................................................... 348/135
IPC .................................................. G01B 11/26
See application file for complete search history.

(56) References Cited

U.S. PATENT DOCUMENTS

| 4,758,729    | A   | 7/1988 | Monnin                   |         |
|--------------|-----|--------|--------------------------|---------|
| 6,674,521    | B1  | 1/2004 | Segall et al.            |         |
| 6,747,267    | B1  | 6/2004 | Balasubramaniam          |         |
| 2005/0150121 | A1* | 7/2005 | Jaklitsch et al.         | 33/286  |
| 2007/0008548 | A1* | 1/2007 | Shibazaki et al.         | 356/498 |
| 2011/0170113 | A1  | 7/2011 | Bridges et al.           |         |
| 2014/0063055 | A1* | 3/2014 | Osterhout et al.         | 345/633 |

FOREIGN PATENT DOCUMENTS

JP            06-317416       11/1994

* cited by examiner

*Primary Examiner* — Jay Patel
*Assistant Examiner* — Yulin Sun
(74) *Attorney, Agent, or Firm* — Prakash Nama; Global IP Services, PLLC; Daniel J. Long

(57) ABSTRACT

An optical automatic attitude measurement device for a lightweight portable optical system is disclosed. In one embodiment, a first optical device is configured to provide an attitude beam. A second optical device mechanically coupled to the first optical device to a lose tolerance. The second optical device is configured to provide a reference beam and to receive the attitude beam from the first optical device. The second optical device is further configured to obtain an attitude measurement by computing a differential measurement between the reference beam and the attitude beam in x and y planes at room temperature.

12 Claims, 6 Drawing Sheets

OPTICAL AUTOMATIC ATTITUDE MEASUREMENT FOR LIGHTWEIGHT PORTABLE OPTICAL SYSTEMS

CROSS-REFERENCE TO RELATED APPLICATIONS

This Application claims rights under 35 USC §119(e) from U.S. Application 61/660,117 filed Jun. 15, 2012, the contents of which are incorporated herein by reference.

BACKGROUND OF THE INVENTION

1. Field of the Invention

The present invention relates to optical systems and more particularly to attitude adjustment for light weight portable optical systems.

2. Brief Description of Related Art

Existing systems measure all three axes of rotation, i.e., angular attitudes, such as pitch, roll and yaw to measure attitude between optical devices. This can be very expensive and calibration intensive and may drive down reliability. Further, attitude between two optical devices, such as between a laser targeting system and a receiver, for example, a north finder is critical to reduce error in target computations. Typically, very large and heavy mechanical interfaces (couplings) are used between the optical devices to hold the two devices tightly and to ensure good alignment from tolerance perspective. However, such large mechanical interfaces may be sensitive, and if they get fouled, dirty, and/or banged, may result in misalignment and unexpected errors.

Another existing approach to measure attitude is to use a checker board pattern to generate parallel lines that provide depth information (pitch, yaw and roll) as the lines diverge or converge in the image captured by the camera. To obtain a higher precision in 3 dimensional attitude measurement between the optical devices, such an approach requires calibration on the non-linear aspects of the camera lens over temperature which may significantly increase cost. Also, these alternative methods require the measurement of roughly 40 or so reference angles and over a range of roughly six temperature set points.

SUMMARY OF THE INVENTION

An optical automatic attitude measurement device and method for lightweight portable optical systems is disclosed. According to one aspect of the present subject matter, the optical automatic attitude measurement device includes a first optical device is configured to provide an attitude beam. A second optical device mechanically coupled to the first optical device to a lose tolerance. The second optical device is configured to provide a reference beam and to receive the attitude beam from the first optical device. The second optical device is further configured to obtain an attitude measurement by computing a differential measurement between the reference beam and the attitude beam in x and y planes at room temperature.

BRIEF DESCRIPTION OF THE DRAWINGS

The advantages and features of the present disclosure will become better understood with reference to the following detailed description and claims taken in conjunction with the accompanying drawings, wherein like elements are identified with like symbols, and in which:

DETAILED DESCRIPTION OF THE INVENTION

The exemplary embodiments described herein in detail for illustrative purposes are subject to many variations in structure and design.

The terms "beam" and "light beam" are used interchangeably throughout the document.

Figure 1:
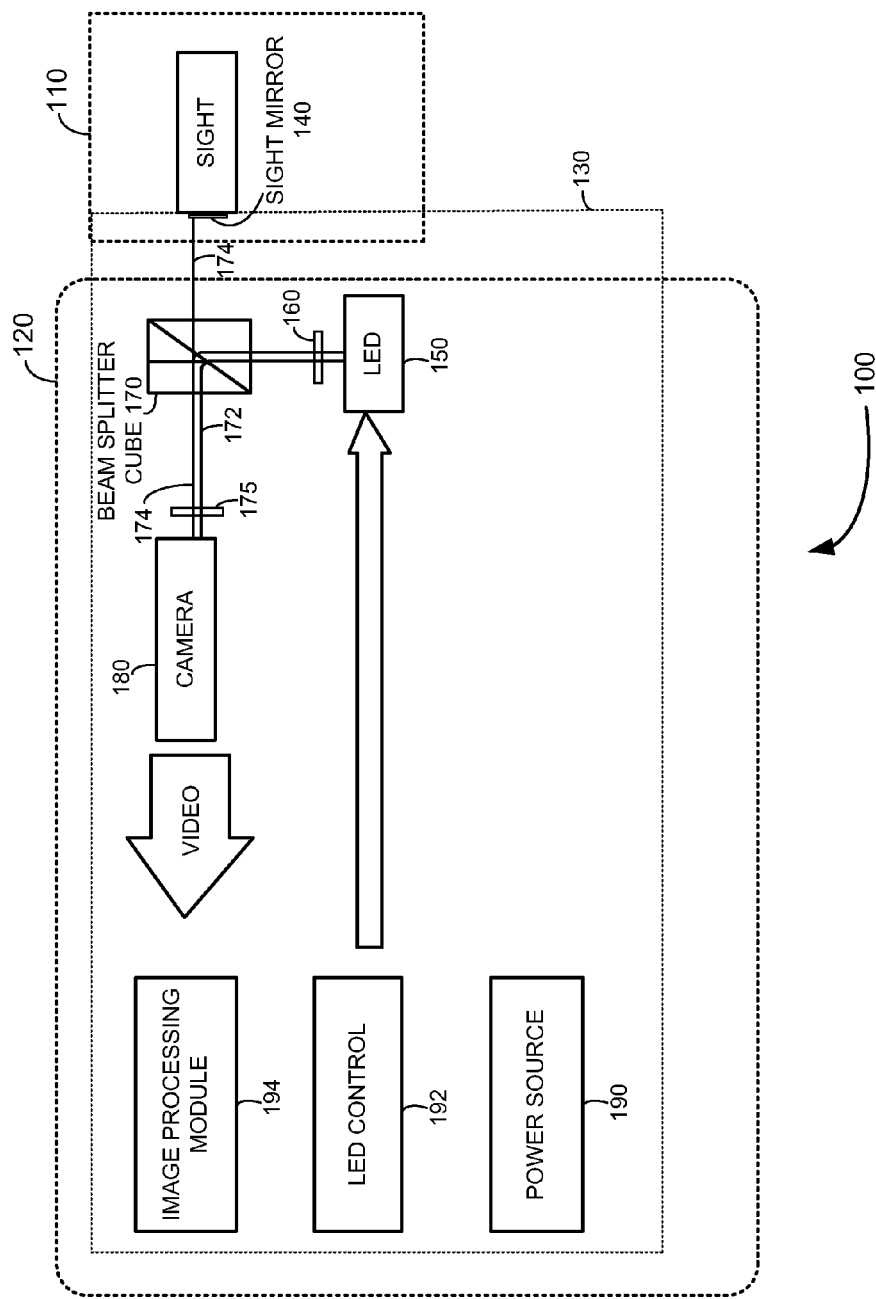
FIG. 1 illustrates an example optical automatic attitude measurement device for lightweight portable optical systems, according to an embodiment of the present subject matter.

FIG. 1 illustrates an example optical automatic attitude measurement device 110 for lightweight portable optical systems 100, according to an embodiment of the present subject matter. As shown in FIG. 1, the optical automatic attitude measurement system 100 includes a first optical device 110 and a second optical device 120 that are mechanically coupled to a loser tolerance than what is required for an optical attitude measurement system that solely depends on mechanical coupling to obtain a desired 3 dimensional attitude between the optical devices. Also, as shown in FIG. 1, the first optical device 110 and the second optical device 120 includes an automatic attitude measurement device 130. Further as shown in FIG. 1, the first optical device 110 includes a sight mirror 140 of the automatic attitude measurement device 130. Furthermore as shown in FIG. 1, the second optical device 120 includes a light source 150, a first collimating optic device 160, a beam splitter cube 170, a second collimating optic device 175 and a camera 180 of the automatic attitude measurement device 130. Further, as shown in FIG. 1, the automatic attitude measurement device 130 includes a power source 190, an LED control 192 and an image processing module 194.

In operation, the first optical device 110 provides an attitude beam 174. Further in operation, the second optical device 120 provides a reference beam 172 and also receives the attitude beam 174 from the first optical device 110. The second optical device then obtains an attitude measurement by computing a differential measurement between the reference beam 172 and the received attitude beam 174 in x and y planes. The attitude measurement is done at room temperature. Further, the obtained attitude measure is impervious to ambient conditions, such as temperature, shock, vibration and the like. Exemplary first optical device 110 and second optical device 120 are first targeting system and a second targeting system, first targeting system and a receiver, such as north finder and so on.

The light source 150 emits a light beam. Exemplary light source is a light emitting diode (LED). The power source 190 provides the needed power to the LED to generate the beam. The beam then passes through the first light collimating optic device 160. The beam splitter cube 170 is then configured to receive the collimated beam from the light source 150 via the first light collimating optic device 160.

Upon receiving the collimated beam from the first collimating optic device 160, the beam splitter cube 170 splits the collimated beam into the reference beam 172 and the attitude beam 174. The beam splitter cube 170 is configured so that the reference beam 172 goes through the beam splitter cube 170 and reflects back as shown in FIG. 1. The beam splitter cube 170 is also configured to reflect the attitude beam 174 and direct the reflected attitude beam 174 towards the sight mirror 140 residing in the first optical device 110 as shown in FIG. 1.

Figure 2:
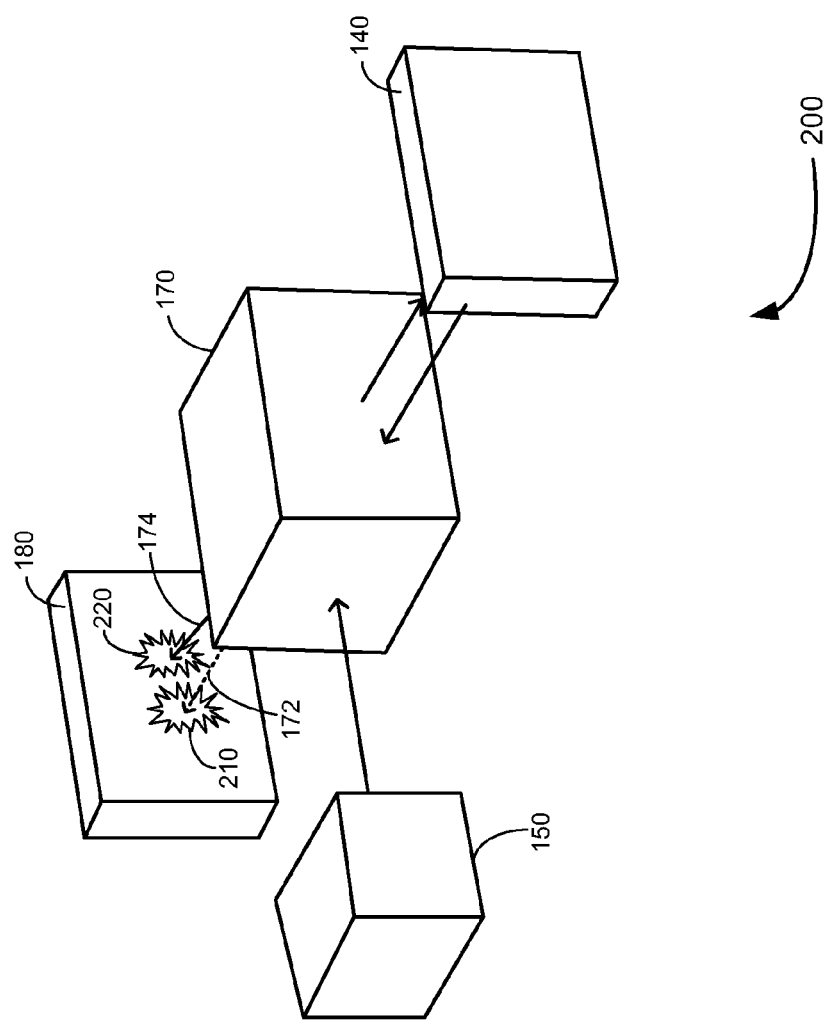
FIG. 2 illustrates travel paths of two collimated light beams coming from an LED to a beam splitter, to a sight mirror and then to camera, such as those shown in FIG. 1, which results in a captured image including two dots associated with two collimated beams, according to an embodiment of the present subject matter.

Upon receiving the reflected attitude beam 174 from the beam splitter cube 170, the sight mirror 140 reflects the attitude beam 174 back to the beam splitter cube 170 as shown in FIG. 1. The beam splitter cube 170 then passes the received reflected attitude beam 174, from the sight mirror 140, through the beam splitter cube 170 and directs the reflected attitude beam 174 along with the reflected back reference beam 172 towards the camera 180 and illuminates the camera 180 to generate two associated dots 210 and 220 on a captured image as shown in FIGS. 1 and 2. Exemplary camera is a cell phone type camera.

In some embodiments, the image processing module 194 computes pixel distance between the two dots 210 and 220, formed on the captured image by the camera 180, in both x and y planes and evaluates 2 of 3 angle attitudes between the first optical device 110 and the second optical device 120. The three angle attitudes are pitch, roll and yaw. In these embodiments, the reference beam 172 and the attitude beam 174 are configured to produce the two dots, on the captured image, having a predetermined size that is suitable for the image processing module to evaluate the centers of the two dots 210 and 220 to single pixel accuracy. Further in these embodiments, the image processing device 194 uses well known centroiding algorithms to evaluate the centers of the two dots 210 and 220. With the optical device arrangement shown in FIG. 1, the movement of the camera 180 and the LED 150 with respect to the beam splitter cube 170 and the sight mirror 140 does not result in any displacement change between the two dots 210 and 220.

Figure 3:
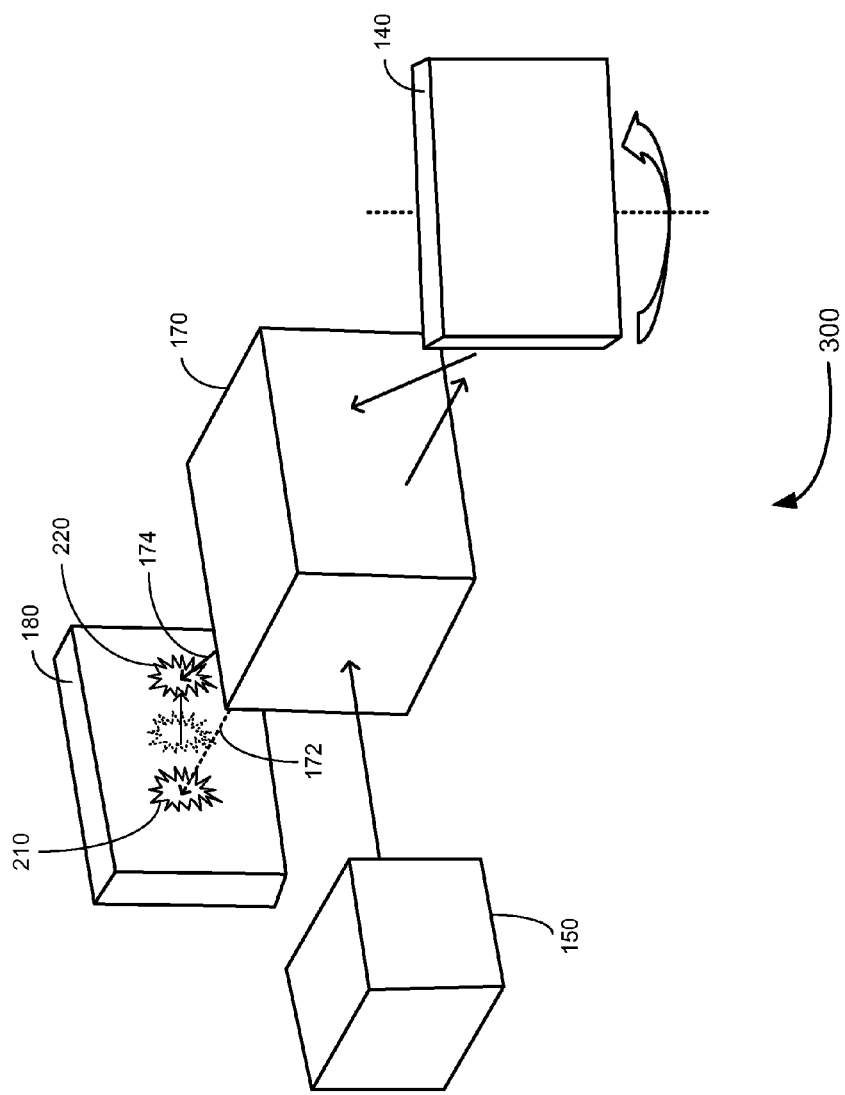
FIG. 3 illustrates effects of yaw movement between the two optical devices, such as those shown in FIG. 1, on a captured image including two dots, which results in an "X" movement on one of the dots, according to an embodiment of the present subject matter.
Figure 4:
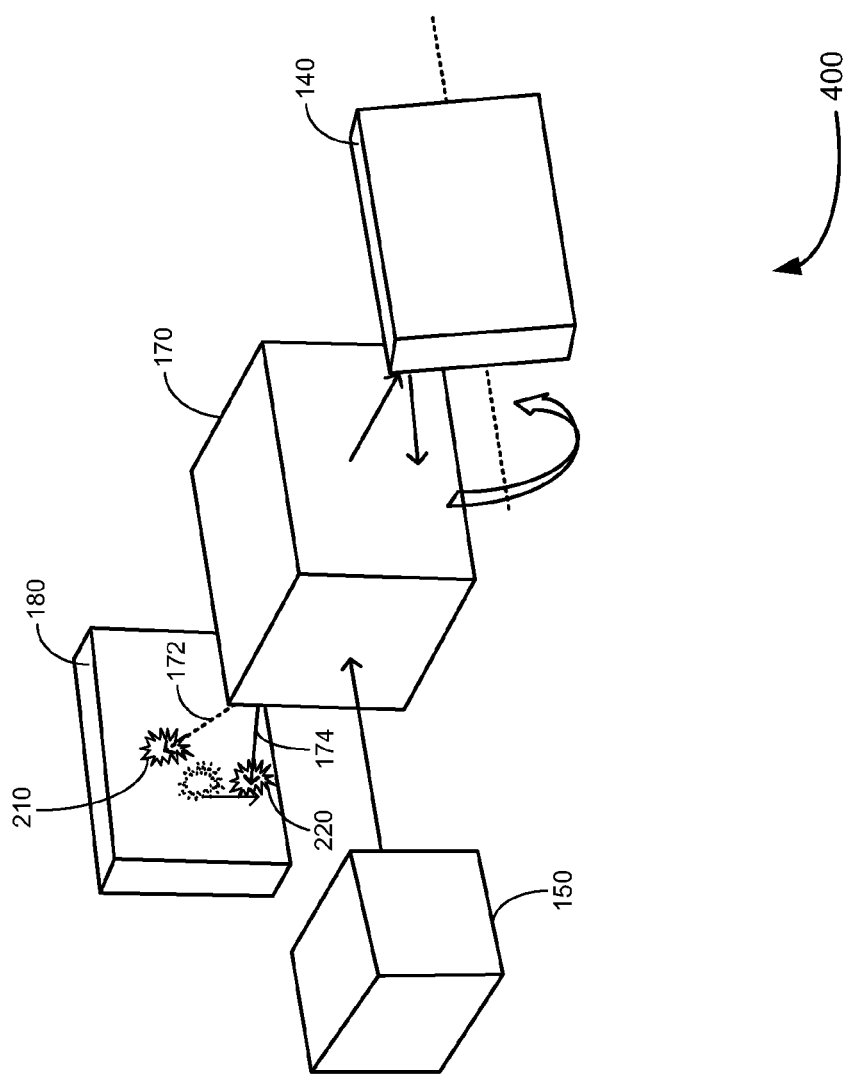
FIG. 4 illustrates effects of pitch movement between the two optical devices, such as those shown in FIG. 1, on a captured image including two dots, which results in a "Y" movement on one of the dots, according to an embodiment of the present subject matter.
Figure 5:
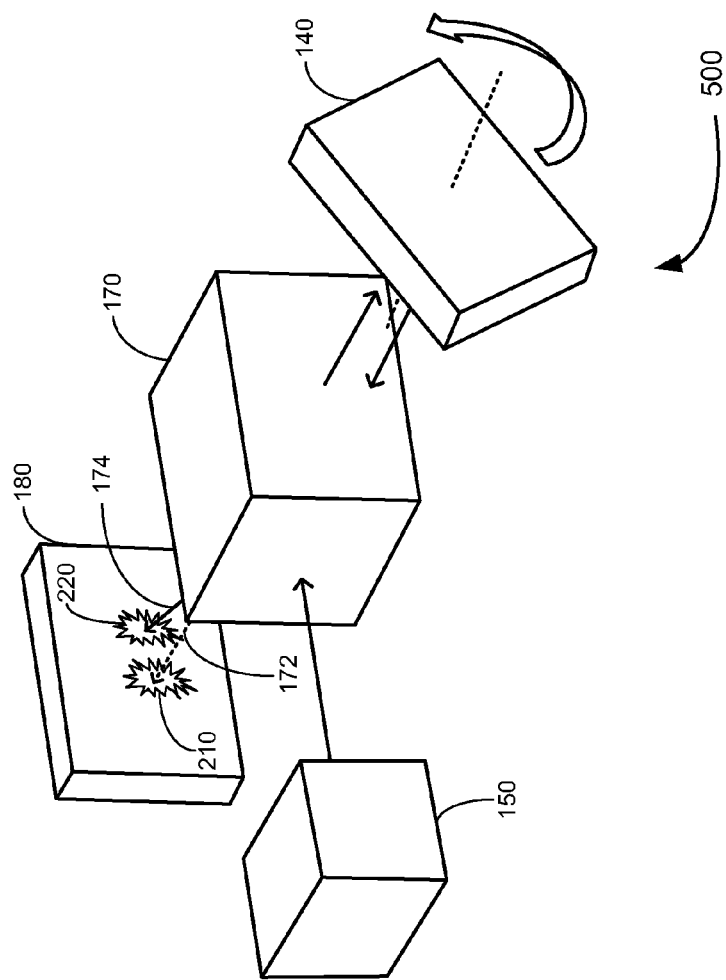
FIG. 5 illustrates effects of roll between the two optical devices, such as those shown in FIG. 1, on a captured image including two dots, which results in no movement in the two dots, according to an embodiment of the present subject matter.
Figure 6:
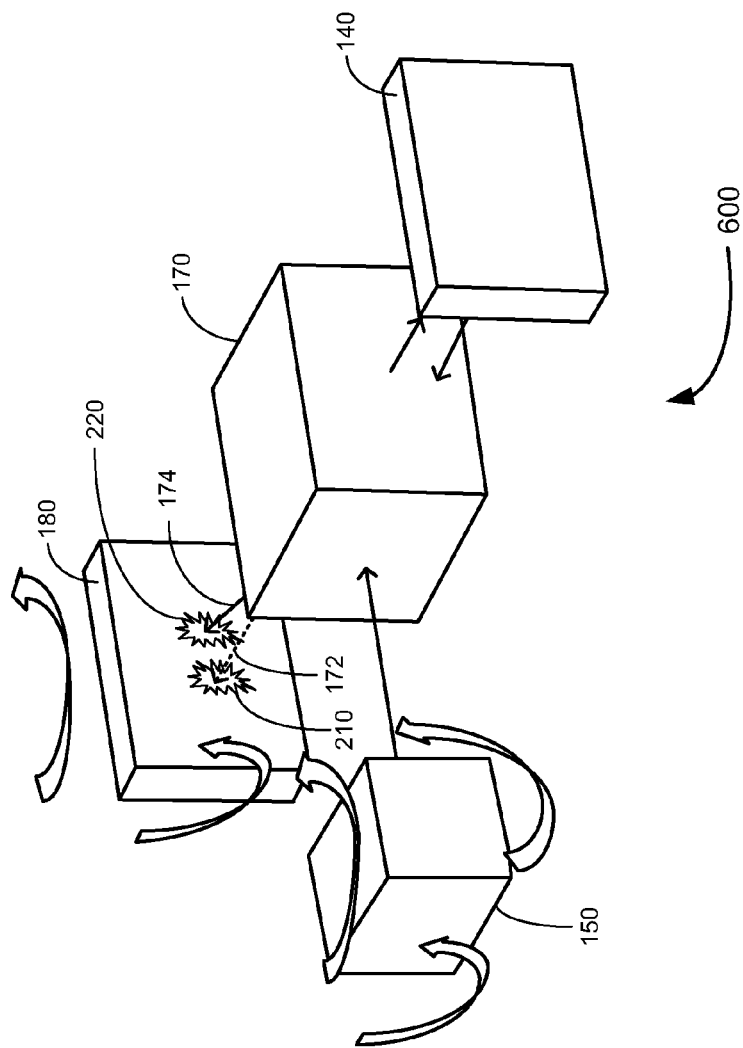
FIG. 6 illustrates effects of roll between LED and camera, such as those shown in FIG. 1, on a captured image including two dots, which results in both the beams and the 2 dots moving together, according to an embodiment of the present subject matter.

Based on the orientation of the sight mirror 140 residing in the first optical device 110 and the beam splitter cube 170 and the camera 180 residing in the second optical device 120, the automatic attitude measurement device 130 measures 2 of the 3 angle attitudes. For example, as shown in FIG. 3, if the sight mirror 140 is rotated about its vertical axis and the beam splitter cube 170 is rotated within the plane of a paper, then the attitude manifests itself into an x-movement about the center of the two dots 210 and 220. Similarly, as shown in FIG. 4, if the sight mirror 140 is rotated about its horizontal axis and the beam splitter cube 170 is rotated within the plane of the paper, then the attitude manifests itself into a y-movement about the center of the two dots 210 and 220. Further as shown in FIG. 5, if the sight mirror 140 is rotated about its central axis and the beam splitter cube 170 is rotated within the plane of the paper, then the sight mirror 140 rotation does not manifest itself in any attitude change between the first optical device 110 and the second optical device 120. Furthermore as shown in FIG. 6, any movement in the light source 150 and the camera 180 results in both the reference beam and the attitude beam moving together by a same amount resulting in no attitude manifestation.

In some embodiment, the second collimating optical device 175 is configured to further collimate the reflected reference beam 172 and the attitude beam 174.

The above technique is applicable to any two optical devices that require computing where they are pointing to. The above technique reduces weight and significantly improves tolerance to fouling in battlefield. Further, the above technique provides environmentally sensitive interface while maintaining high accuracy between optical devices in a portable optical system. Furthermore, the above technique is an active feedback system that dynamically provides the needed attitude measurement while the optical system is in operation. Moreover, the above technique significantly loosens up tolerance requirements to be maintained between the optical devices in the portable optical system. In addition, the above system can be deployed in confined volumes. Also, the present invention uses off-the-shelf LED and cell phone type cameras, thereby component costs are significantly reduced. The above technique is also impervious to environmental conditions and whereas the alternate methods require calibrating out the environmental impacts, such as temperature and so on. The above technique is based on differential measurement and all of the components, which can move with environmental impacts, affect both the reference and measurement beams, thereby the final attitude measurement between the two optical devices are differential in nature resulting in being impervious to the environmental conditions.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, to thereby enable others skilled in the art to best utilize the present disclosure and various embodiments with various modifications as are suited to the particular use contemplated. It is understood that various omission and substitutions of equivalents are contemplated as circumstance may suggest or render expedient, but such are intended to cover the application or implementation without departing from the spirit or scope of the claims of the present disclosure.

What is claimed is:

1. An optical automatic attitude measurement device for a lightweight portable optical system, comprising:
   a first optical device including a sight mirror; and
   a second optical device mechanically coupled to the first optical device to a lose tolerance, the second optical device comprises:
   a light source to generate a beam;
   a first collimating optic device to collimate the generated beam;
   a beam splitter cube configured to:
      receive the collimated beam from the first collimating optic device and split the collimated beam into a reference beam and an attitude beam;
      reflect the attitude beam and direct the reflected attitude beam towards the sight mirror residing in the first optical device; and receive the reflected attitude beam from the sight mirror and pass it through the beam splitter cube, wherein the beam splitter cube is configured such that the reference beam goes through the beam splitter cube and gets reflected back; and a camera configured to receive the reflected attitude beam and the reflected reference beam from the beam splitter cube, wherein the second optical device is configured to obtain an attitude measurement by computing a differential measurement between the reflected reference beam and the reflected attitude beam from the first optical device in x and y planes at room temperature.

2. The device of claim 1, wherein the obtained attitude measurement is impervious to ambient conditions, and wherein the ambient conditions are temperature, shock and/or vibration.

3. The device of claim 1,
wherein the received attitude beam and the reference beam illuminate the camera and generate associated two dots on a captured image.

4. The device of claim 3, wherein the light source is a light emitting diode (LED).

5. The device of claim 4, wherein the camera is a cell phone type camera.

6. The device of claim 5, wherein the second optical device comprises:
a power source for the LED;
a LED control to provide the needed light source for the automatic attitude measurement; and
an image processing module configured to compute pixel distance between the two dots in both x and y planes on the camera and evaluate 2 of 3 angle attitudes between the first optical device and the second optical device.

7. The device of claim 6, wherein the angle attitudes are selected from the group consisting of pitch, roll, and yaw.

8. The device of claim 3, wherein the second optical device further comprises a second collimating optical device for further collimating the received reference beam and the attitude beam from the beam splitter cube and before the reference beam and the attitude beam enters the camera.

9. The device of claim 1, wherein the sight mirror in the first optical device reflects the received attitude beam back to the beam splitter cube.

10. An optical automatic attitude measurement device for a lightweight portable optical system, comprising:
a first optical device including a sight mirror; and
a second optical device mechanically coupled to the first optical device to a lose tolerance, the second optical device comprises:
a light source to generate a beam;
a first collimating optic device to collimate the generated beam;
a beam splitter cube configured to receive the collimated beam from the first collimating optic device and split the collimated beam into a reference beam and an attitude beam, wherein the beam splitter cube is further configured to reflect the attitude beam and direct the reflected attitude beam towards the sight mirror residing in the first optical device, wherein the sight mirror in the first optical device reflects the received attitude beam back to the beam splitter cube, and wherein the beam splitter cube is furthermore configured to receive the reflected attitude beam from the sight mirror and pass it through the beam splitter cube and the beam splitter cube is also configured such that the reference beam goes through the beam splitter cube and gets reflected back;
a camera configured to receive the reflected attitude beam and the reflected reference beam from the beam splitter cube, and wherein the received attitude beam and the reference beam illuminate the camera and generate associated two dots on a captured image; and
an image processing module configured to obtain an attitude measurement by computing pixel distance between the two dots in both x and y planes on the camera and evaluate 2 of 3 angle attitude measurements between the first optical device and the second optical device, wherein the image processing computes centers of the two dots to single pixel accuracy.

11. The device of claim 10, wherein the two dots are of a predetermined size that is suitable for the image processing module to evaluate centers of the two dots to the single pixel accuracy.

12. The device of claim 10, wherein the angle attitudes are selected from the group consisting of pitch, roll, and yaw.

* * * * *